United States Patent [19]

Balaam et al.

[11] Patent Number: 4,667,590
[45] Date of Patent: May 26, 1987

[54] CLOSED FOOD PROCESSING SYSTEM AND LIQUID ADJUSTMENT APPARATUS FOR USE THEREIN

[75] Inventors: William J. D. Balaam, West Boxford, Mass.; Thomas E. Szemplenski, Overland Park, Kans.

[73] Assignee: Mars, Inc., McLean, Va.

[21] Appl. No.: 794,175

[22] Filed: Nov. 1, 1985

Related U.S. Application Data

[63] Continuation-in-part of Ser. No. 679,946, Dec. 10, 1984, abandoned.

[51] Int. Cl.⁴ .................... A23G 1/00; A23G 1/06
[52] U.S. Cl. ........................... 99/470; 99/483; 99/517; 165/109.1; 366/149
[58] Field of Search ............... 99/467, 470, 473–475, 99/483, 516, 517, 452, 453, 455; 366/144, 148, 149, 309–312; 165/92, 109 R; 100/112, 110, 116

[56] References Cited

U.S. PATENT DOCUMENTS

| | | |
|---|---|---|
| 2,592,983 | 4/1952 | Hildebrandt . |
| 2,793,582 | 5/1957 | Rothe et al. . |
| 3,126,818 | 3/1964 | Koelsch ............................ 100/112 |
| 3,188,942 | 6/1965 | Wandel . |
| 3,433,147 | 3/1969 | Pedersen ............................ 99/455 |
| 3,762,563 | 10/1973 | Peterson . |
| 4,095,307 | 6/1978 | Brubaker ....................... 366/312 X |
| 4,098,182 | 7/1978 | Rasmus . |
| 4,446,781 | 5/1984 | Schmitt ................................ 99/483 |

FOREIGN PATENT DOCUMENTS 031544 7/1981 European Pat. Off. .

OTHER PUBLICATIONS

Cahiers Alfa-Laval, No. 12, 1981, Scraped Surface Heat Exchanger, pp. 22–25.
Jupiter System, APV, published 1981.
Votator, Post Dilution Technique.

Primary Examiner—Timothy F. Simone
Attorney, Agent, or Firm—Davis Hoxie Faithfull & Hapgood

[57] ABSTRACT

A closed system for continuous processing of a pumped food product and scraped surface liquid adjustment devices for use therein are described. In the system, a pumped product is heated or sterilized by a scraped surface heat exchanger from which it is pumped to a scraped surface liquid adjustment device wherein liquid is either added or drained off in a continuous manner as required by the particular apparatus.

21 Claims, 6 Drawing Figures

CLOSED FOOD PROCESSING SYSTEM AND LIQUID ADJUSTMENT APPARATUS FOR USE THEREIN

This is a continuation-in-part of copending U.S. Application Ser. No. 679,946 filed Dec. 10, 1984, now abandoned. This invention relates to closed, continuous food processing systems for food products including particulate matter. More particularly, it relates to an improved system for such processing in which a scraped surface heat exchanger feeds food matter to a scraped surface liquid adjustment device which is used to adjust the liquid content of the finished food product produced by the system, while maintaining a high pass through rate.

Many food products can be produced more quickly, and consequently with higher quality and with less energy when the product is processed in a closed system using a scraped surface heat exchanger for purposes of heating to a predetermined temperature threshold (such as sterilization temperature), rather than using other conventional heating or sterilization techniques such as retorting. However, such a processing technique usually can be used only in cases where the food product can be conveyed or moved sufficiently quickly. In order to facilitate conveying food products, a liquid carrier medium is often used, such as water, natural juices or sugar solutions of varying degree Brix. On the other hand, food processors are continually trying to improve ways to provide finished food products with less liquid (with higher "drained weight"). For these types of final products, it is necessary to eliminate much of the liquid carrier medium before final packaging.

One object of the present invention is to provide a system for continuously processing food products containing particulate matter while maintaining at a desired low value the percentage of liquid carrier medium in the final product discharged from the system.

For certain applications, it is desirable to heat for sterilization or other purposes a highly particulate portion of a final food product, using a scraped surface heat exchanger and to add at a later stage a more aqueous portion. Thus, for example, it might be desired to cook or sterilize meat or green beans, using a scraped surface heat exchanger and then at a later time add a more liquid element such as gravy or butter sauce, which has a different cooking time or which can be sterilized more efficiently in some other fashion.

For other applications, it is desirable to heat or sterilize a substantially liquid intermediate product using a scraped surface heat exchanger and then to add a second liquid intermediate product. For example, to make a cream sauce in a continuous process, it would be desirable to use a scraped surface heat exchanger to gelatinize a starch mixture and then to add a liquid based flavoring.

It is another object of the present invention to provide a versatile system which can be used to add quickly and efficiently a substantially liquid medium to a final food product which is continuously processed in a high throughput closed food processing system.

Depending upon the particular application, systems according to the present invention may be either aseptic or nonaseptic. It is an additional object of this invention to provide systems which can be adapted to be either aseptic or nonaseptic as the application demands.

In one system according to the invention, intermediate food product including sufficient liquid carrier for pumping is delivered by pump means such as a first feed pump from supply means such as a supply vessel to a heat exchanger of the scraped surface type operable to heat the product to a sterilizing temperature. The product then passes at sterilizing temperature through a holding tube to complete the sterilization and thence through heat exchanger means of the scraped surface type operable to cool the product. The cooled product is then passed through a deliquifying device to a discharge line for delivering the product with the desired low liquid content to an aseptic filler.

The deliquifying device comprises an inner cylinder forming a central chamber and having holes leading from this chamber to an annular space within an outer cylinder, the holes being smaller than most of the particulate matter in the intermediate food product. A rotor extending through the central chamber has scraper means which act upon the food product passing through the chamber so as to expel liquid from the product through the holes and into the annular space, from which the liquid discharges through a suitable outlet. By adjusting the rotor speed, the amount of liquid expelled from the product can be controlled. Additionally, the scraper means continuously scrapes the inner surface of the inner cylinder and prevents the holes from clogging.

To sterilize the system, the feed pump is shut off and a second pump delivers sterilized water from a tank to a point in the product supply line between the feed pump, and the scraped surface heat exchanger. The water at sterilizing temperature circulates through the system via a valve which closes the product discharge line and passes the water through a return line to the tank. The return line includes a cooler for cooling the water to below the flash point before it flows through a back pressure valve to the tank.

The circulating sterilized water can be directed through the deliquifying device to sterilize it along with the rest of the system. For some applications, however, it is desirable to sterilize the deliquifying device by steam. To this end, a duct which bypasses the deliquifying device is provided, with aseptic valve means for controlling the flow of water therethrough. Means are further provided to furnish steam to the device at regions which insure sterilizing of all surfaces which contact the food product as well as the walls of the annular space through which the expelled liquid flows.

Examples of food products which can be processed in the new system wherein the scraped surface water adjustment device functions to decrease the liquid in the final product are tomato products, such as ¼" diced tomatoes, pastas, rice and dried beans. The latter three food products all require large amounts of water for hydration purposes and in order to move them through the system; however, such large amounts of water are not desired in the typical end products. For some foodstuffs, as will be discussed in detail below, it is desirable to have a liquid adjustment device with several chambers for both adding and removing liquid and to allow other process variations.

A second system according to the invention is substantially similar to that which is described above except that its liquid adjustment device is used to add a liquid medium to the final food product. Examples of food products which can be processed by the second system are meat with gravy, green beans with butter or cheese sauce, and cream sauces in which a flavoring or flavorings are added to a gelatinized starch base. In this second system, a second pump means is used to pump the liquid to be added through the holes of the liquid adjustment device and into the chamber where an intimate mixing occurs.

The above examples are representative of a few of the many possibilities. Additional food products for which both systems are suitable will be immediately apparent to the food processing industry, and are contemplated by the present invention.

For a more complete understanding of the invention, reference may be had to the following description in conjunction with the accompanying drawings, in which.

Figure 1:
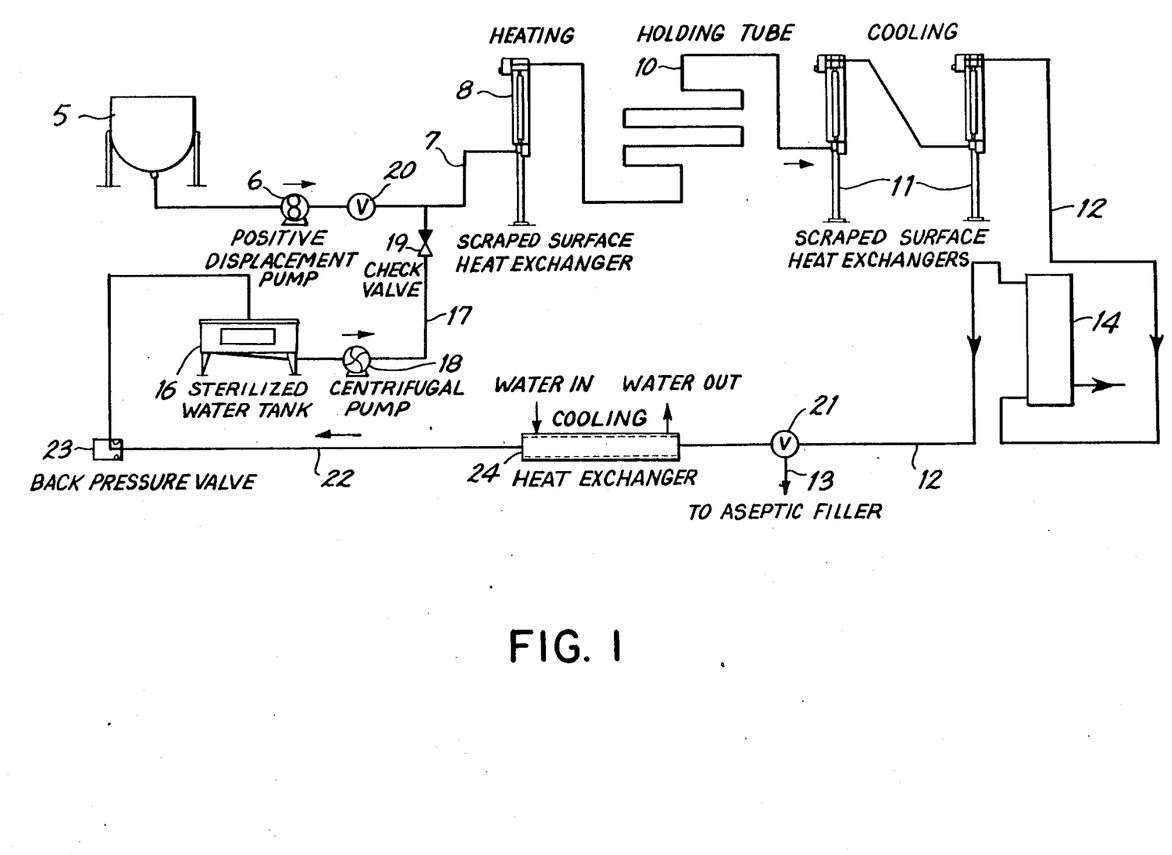
FIG. 1 is a schematic view of a preferred form of the new system.

Referring to FIG. 1, the system there shown comprises a means for supplying an intermediate food product such as supply vessel 5. This vessel can serve as a surge or balance tank or for mixing several ingredients of the food product prior to processing. From vessel 5, the product is delivered at a controlled rate by conveying or pump means such as a positive displacement pump 6 through connection means such as supply line 7 to a scraped surface heat exchanger 8. There the product is heated to a predetermined threshold temperature or a sterilization temperature as desired while scraping the heating surface to maintain uniformity of the product and prevent it from burning on the heating surface. Heat exchanger 8 is of the vertically oriented type. An example of the preferred heat exchanger is one sold by the Contherm Division of Alfa-Laval, Inc., Poughkeepsie, N.Y., under the registered trademark Contherm.

The heated intermediate product flows from heat exchanger 8 through a holding tube 10 where the product may remain for a sufficient time to insure destruction of undesired bacteria or to achieve other desired effects. It then flows through scraped surface heat exchanger means 11 for cooling to a temperature at which it can be passed to a filler for packaging. As shown, the cooling means 11 consists of two series-connected heat exchangers, each of which may be a "Contherm" heat exchanger.

From cooling means 11, the sterilized product passes through cooled product line 12 to product discharge line 13 by way of a scraped surface liquid adjustment device 14, to be described in detail below. Discharge line 13 conducts the product to a filler (not shown) for packaging. The particular arrangement of scraped surface heat exchanger 8 and scraped surface liquid adjustment device 14 shown and described is preferred for processing certain foods such as diced tomatoes. However, different arrangements for other applications are contemplated. For example, in some applications it may be desirable to connect the output of a scraped surface heat exchanger directly to a scraped surface liquid adjustment device without holding tubes or cooling devices.

To enable sterility of the food product to be maintained, the above-described embodiment is provided with an arrangement for sterilizing all product-contacting surfaces on the sterile side of the system. This arrangement comprises a tank 16 for holding sterilization water, a water supply line 17 leading from tank 16 and including a second pump 18, which may be a centrifugal pump, and valve means in the form of a check valve 19 for connecting line 17 to product supply line 7. This connection is downstream from the first pump 6 and from a valve 20 which is closed during sterilization of the system. A 3-way valve 21 is operable to disconnect cooled product line 12 from product discharge line 13 and connect it instead to line 22 for returning sterilization water to tank 16.

The water can be heated to the necessary sterilizing temperature by circulating it through the scraped surface heat exchanger 8. It may first be preheated in tank 16. Since the necessary sterilizing temperature may be 280°-300° F., a back pressure valve 23 is provided in water return line 22 to maintain a sufficiently elevated pressure to prevent flashing of the water during sterilizing. A heat exchanger 24 in return line 22 serves to cool the water to just below the flash point before it passes through back pressure valve 23 to tank 16.

Figure 2:
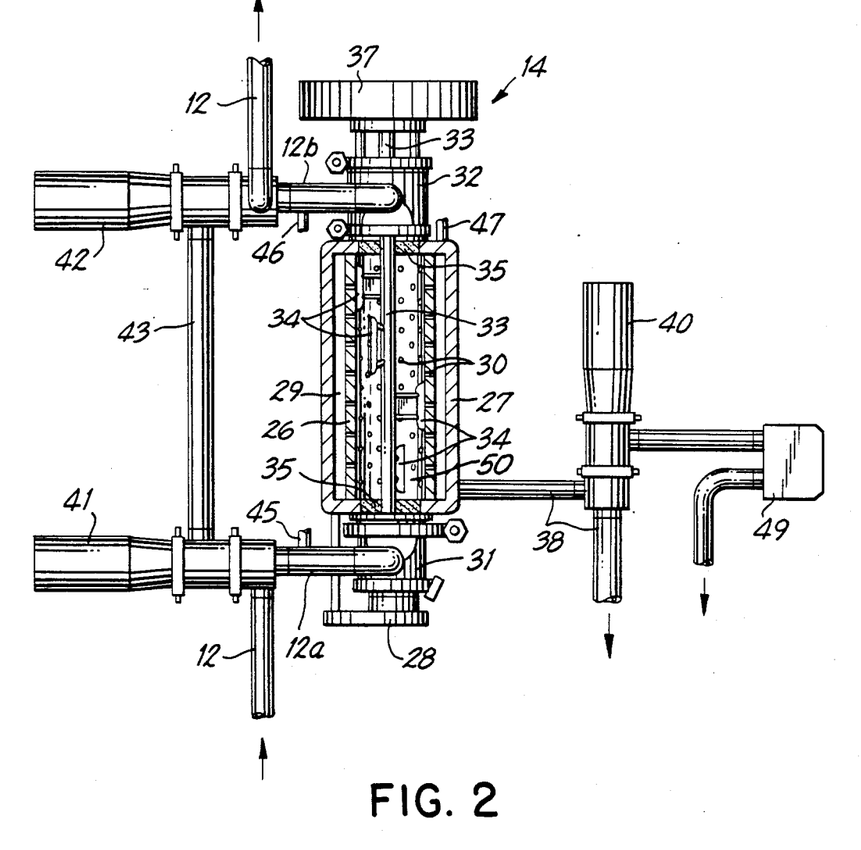
FIG. 2 is an elevational view, partly in section, in which the liquid adjustment device shown in FIG. 1 is a product deliquifying device with added equipment for sterilization.
Figure 3:
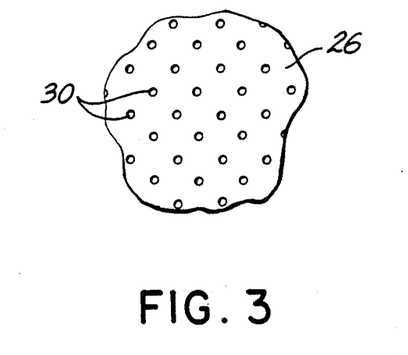
FIG. 3 is a partial development of the inner cylinder in FIG. 2 showing some of the perforations for draining liquid from the food product.

As shown in FIG. 2, the scraped surface liquid adjustment device 14 comprises stationary inner and outer vertical cylinders 26 and 27, respectively, mounted on a frame 28 and forming between them an annular liquid-receiving space 29. Inner cylinder 26 is perforated to form a series of drain holes 30 distributed over its cylindrical surface (FIG. 3). The interior of inner cylinder 26 defines a chamber 50. Adjacent the lower and upper ends of the cylinders are stationary heads or end caps 31 and 32 connected to inlet duct means 12a and outlet duct means 12b respectively, forming parts of cooled product line 12. Duct means 12a and 12b communicate with the interior of inner cylinder 26 through end caps 31–32 and suitable flow passages (not shown) for the product.

A vertical rotor shaft 33 is journalled at its opposite end portions in the end caps 31–32 and extends through inner cylinder 26 axially thereof. Shaft 33 carries radially extending scraper blades 34 engageable with the inner surface of the inner cylinder 26. Scraper blades 34 may be arranged as disclosed in U.S. Pat. No. 3,633,664 issued Jan. 11, 1972.

At their opposite end portions, the two cylinders are sealed to each other by means of aseptic or double seals 35. The latter may be of the type in which a sterile medium, such as steam, sterile water or a chemical sterilant, flows freely. The seals 35 closely surround rotor shaft 33 and serve to exclude atmosphere from the interior of inner cylinder 26 and from the annular space 29. Preferably, these blades should scrape all the holes 30 so that none of them will become clogged.

Rotor shaft 33 is driven by driving means 37, the latter being adjustable to vary the rotational speed. As the product is continuously forced upward in cylinder 26 from inlet duct means 12a it is contacted by the radial scrapers 34 which carry the product past the drain holes 30 while pressing it against the inner surface of the cylinder. Since the holes are smaller than the product's particulate matter, the latter is retained in cylinder 26 while liquid is expelled from the product through the holes by the scraper action. Also, the combination of the elevated pressure in the system and the centrifugal force created by the rotor 33-34 enhances the separation of liquid from the product. The expelled liquid entering the annular space 29 discharges from the system through a drain line 38.

Thus, the food product discharges through outlet duct means 12b with a percentage of the liquid content removed. The amount of the removed liquid depends in part upon the size of the holes 30, which is dictated by the nature of the food product, and also upon the product's retention time in cylinder 26 and the speed at which rotor shaft 33 is driven. The amount of removed liquid can be easily increased by increasing the rotor speed. Whatever its speed may be, its blades 34 continually scrape the inner surface of cylinder 26, thereby preventing the holes from becoming plugged or packed with product and insuring against clogging of the device.

During sterilizing, pump 6 is idle while pump 18 is in operation, valve 20 is closed, valve 21 is positioned to interconnect lines 12 and 22, and cooler 24 is in operation. Also, the coolant is removed from cooling means 11. In one mode of sterilizing, the sterilized hot water circulating through the system flows upwardly through deliquifying device 14 where it contacts all those surfaces which are contacted by the food product. To prevent escape of the water, drain line 38 is closed by means of a valve 40.

In the preferred mode of sterilizing, the deliquifying device 14 is segregated from the rest of the system by means of two 3-way aseptic flow diversion valves 41 and 42. In their normal positions, these valves allow flow to enter and leave the device 14 by way of the inlet and outlet duct means 12a and 12b. During sterilizing, however, the valves 41-42 are positioned to close the connection from line 12 to each of the duct means 12a-12b and divert the flow of sterilized water through a line 43 which bypasses the device 14. Sterilizing of the device 14 is then accomplished by introducing steam into the device at three regions. A first steam supply duct 45 leads into inlet duct means 12a between valve 41 and the inlet of device 14; a second steam supply duct 46 leads into outlet duct means 12b between valve 42 and the outlet of device 14; and a third steam supply duct 47 leads into annular space 29.

Culinary steam supplied through ducts 45-47 freeflows through the device 14 where it contacts all surfaces which contact the food product. The steam flows further through annular space 29 to drain line 38 where valve 40, which is a 3-way diversion valve, is positioned to divert the flow to a steam trap or condensate return 49. At the same time, sterilized water flowing through the rest of the system, by way of bypass line 43, acts to sterilize the side of each valve 41-42 which is remote from the device 14.

Additional exemplary systems according to the present invention are discussed below.

Figure 4:
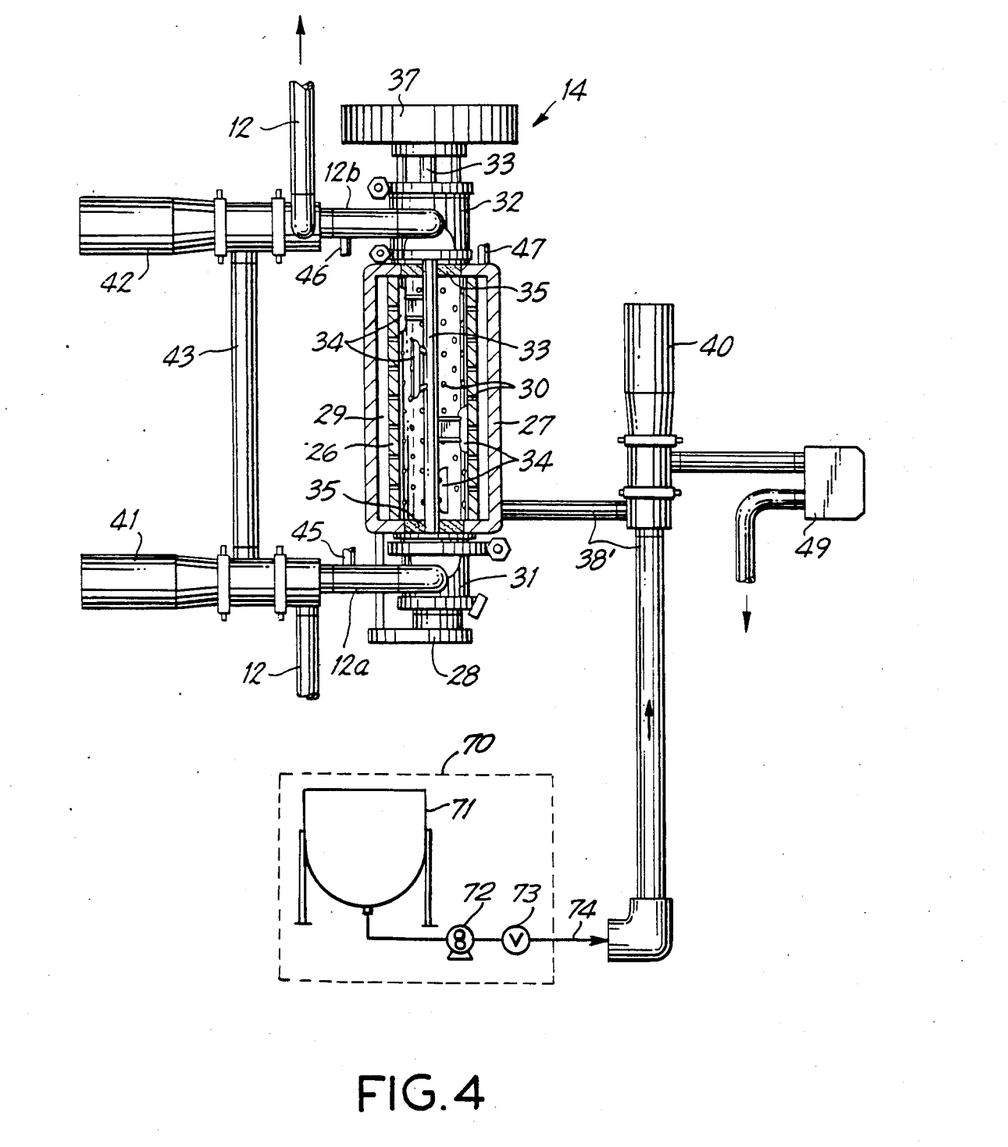
FIG. 4 is an elevational view, partly in section, in which the liquid adjustment device of FIG. 1 is a product liquifying device.

The versatility of scraped surface liquid adjustment device 14 is illustrated by FIG. 4. For certain food processing applications, it is desirable to add an additional liquid medium to a particulate or other intermediate food product. One reason for doing this is that the liquid portion may have a different cook time than the intermediate food product. For example, in making a meat with gravy final product, one might desire to mix meat with a cook time of approximately ten minutes to gravy with a cook time of roughly three to four minutes. If the gravy is cooked with the meat for ten minutes, there is a significant loss of taste as a result of overcooking. Further, significant energy is wasted to do this overcooking. In addition, liquid such as gravy can be sterilized or cooked much less expensively than by using the scraped surface heat exchanger system which is preferred for meat. As another example, in making a cream sauce via a continuous process, it may be desirable to use a scraped surface heat exchanger to produce a base of gelatinized starch, and to add liquid flavoring using a scraped surface liquid adjustment device.

In FIG. 4, the device shown in FIG. 2 is shown converted to carry out liquid additions. To accomplish this conversion, the drain line 38 shown in FIG. 2 is converted to a liquid input line 38' and a liquid source 70, comprising supply vessel 71, a second pump 72, valve 73, and a connecting line 74, is provided. Pump 72 pumps liquid to be added at a pressure high enough to force it through the holes 30, and to prevent liquid in the intermediate food product in chamber 50 passing outwardly. Such a system might be used for producing end products such as vegetables with cheese or butter sauce, meat and gravy dishes for frozen dinners, spaghetti sauce, or cream sauce.

In each of the above cases, the system of the present invention allows rapid and efficient food processing. The perforations in inner cylinder 26 also provide for a particularly intimate mixing within chamber 50 of the liquid from input 38' and the particulate intermediate product from inlet 12.

Systems according to the invention may also be used to both add and subtract liquid during processing. To adapt the system of FIGS. 1 and 2 for this service, the liquid adjustment device 14 shown in FIG. 2 is removed and replaced with a two compartment device such as the adjustment device 140 shown in FIG. 5.

Figure 5:
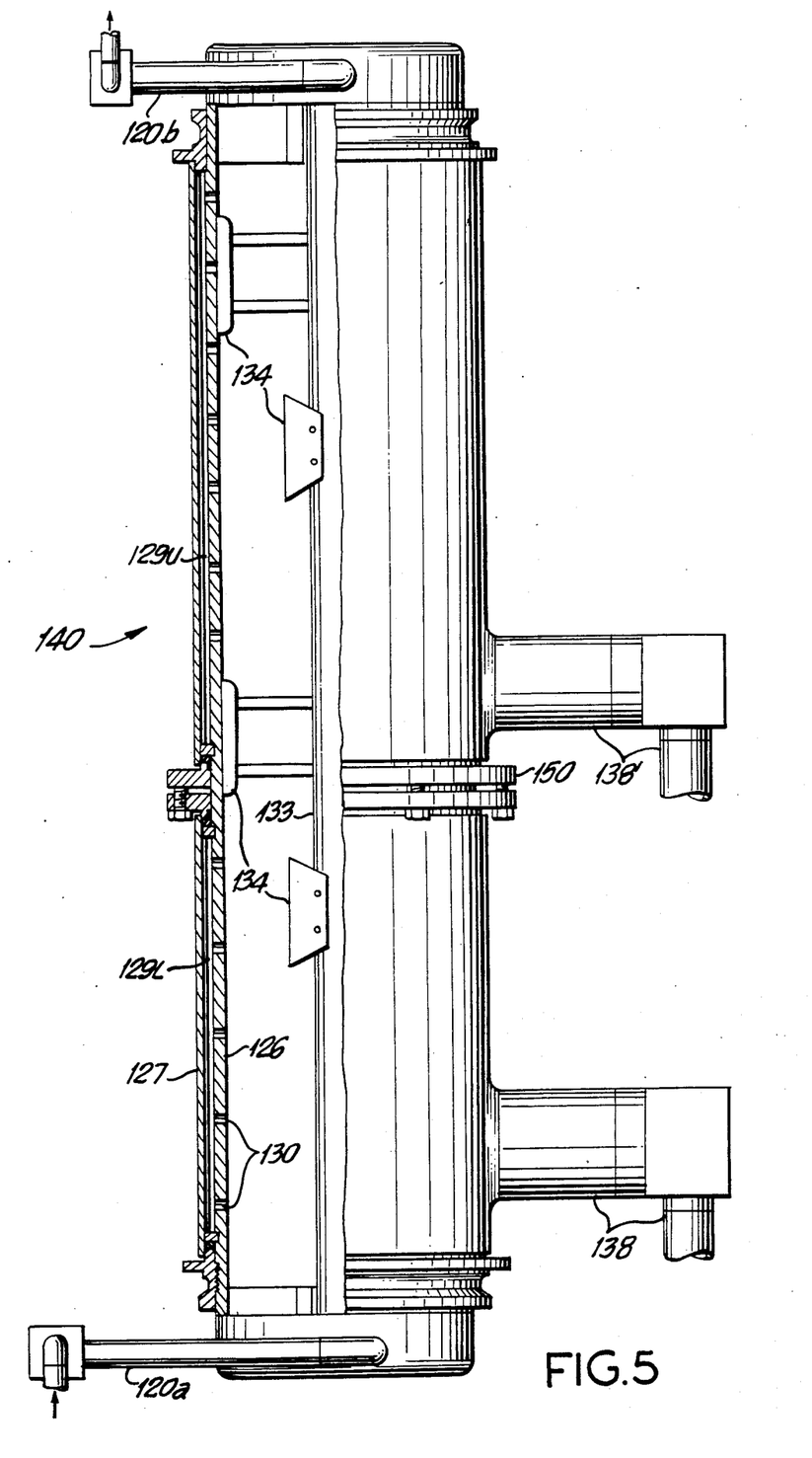
FIG. 5 is an elevational view, partly in section, in which the liquid adjustment device of FIG. 1 is a two chamber device.

Product under pressure enters the device 140 at inlet 120a and leaves at outlet 120b. Device 140, like device 14, has an outer cylinder 127 separated from an inner cylinder 126 having liquid passing perforations 130. The perforations 130 communicate with an upper annular region 129U and a lower annular region 129L which are isolated from each other by a seal 150. Device 140 includes a plurality of scraper blades 134 which are mounted on a rotor shaft 133. In communication with the lower annular region 129L is a liquid opening such as line 138 which can be either a drain or an inlet line as required by the application. In communication with the upper annular region 129U is a liquid opening such as line 138' which can be either an inlet or a drain line.

In use, for example, in producing cooked rice, line 138 may be an inlet line connected to a reservoir of rinse water and line 138' may be an outlet line for draining off excess liquid before the finished product exits device 140 via outlet duct 120b. Alternatively, for example, in producing spaghetti with sauce, the line 138 may be a drain line for draining off excess water from the cooked spaghetti and line 138' may be an inlet line connected to a source of cooked sauce which is added in the upper portion of the liquid adjusting device 140. Many additional suitable food processing applications will be apparent to those skilled in the art.

Figure 6:
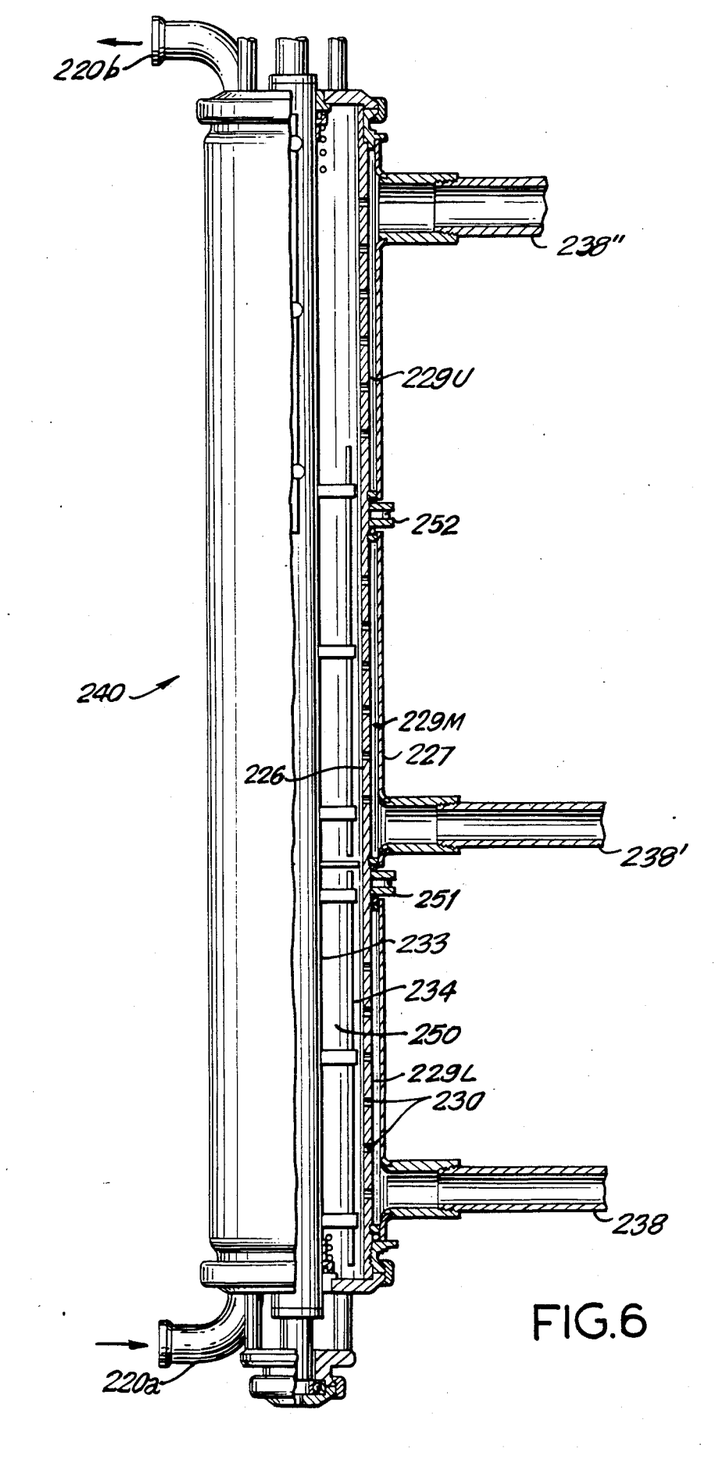
FIG. 6 is an elevational view, partly in section, in which the liquid adjustment device of FIG. 1 is a three chamber device.

A further embodiment of the invention, is shown in FIG. 6. Referring to FIG. 6, liquid adjustment device 240 includes an annular chamber consisting of lower, middle and upper regions 229L, 229M, and 229U which are isolated from each other by seals 251 and 252. Device 240 also includes liquid conduits 238, 238', and 238" for adding and draining of liquid, as desired, from a chamber 250 defined by the wall of an inner cylinder 226 having perforations 230. Intermediate product may be furnished to the device by inlet duct 220a, and scraped along by scraper blades 234 fitted to a rotor shaft 233. Outlet duct 220b is furnished for recovering final product. One example of a process in which the device of FIG. 6 may be used is a rice cooking operation in which excess cooking water is drained at line 138, rinse water is added at line 138', and finally the excess rinse water is drained at line 138".

For all of the above examples, aseptic valving and sterilizing connections can be made or not depending upon the requirements of the application. Such connections can be made in accordance with the connections discussed in connection with FIGS. 1 and 2 or otherwise as appropriate.

We claim:

1. In a closed system for continuous processing of an intermediate food product containing a substantial amount of particulate matter and a liquid carrier medium to a final food product having a predetermined different proportion of liquid medium, the combination of a scraped surface heat exchanger operable to heat the intermediate food product to a predetermined threshold temperature, means for conveying the intermediate food product through the scraped surface heat exchanger, and a scraped surface liquid adjustment device for adjusting the amount of liquid in the food product from the scraped surface heat exchanger, said scraped surface liquid adjustment device being connected to the scraped surface heat exchanger and including inner and outer cylinders forming an intervening liquid receiving space having a liquid opening, the inner cylinder forming a central chamber and having holes through which said chamber communicates with said space, said holes being of a size adequate to allow liquid to pass to and from the central chamber, and from and to the intervening liquid receiving space, but of a size to prevent passage of most of the particulate matter of the intermediate food product, a rotor in said chamber having scraper means engageable with the inner surface of the inner cylinder, and means for driving the rotor to cause said scraper means to scrape particulate matter from said inner surface to prevent clogging of said holes, whereby intermediate food product may be conveyed through the scraped surface heat exchanger, heated therein to the predetermined threshold temperature, and conveyed from the scraped surface heat exchanger to the scraped surface liquid adjustment device for conversion to the final food product by adjustment of the liquid content.

2. The apparatus of claim 1 in which the scraped surface liquid adjustment device is a deliquifying device in which the liquid opening is connected to a drain line for draining away excess liquid from the intermediate food product.

3. The apparatus of claim 1 in which the scraped surface liquid adjustment device is a liquid addition device in which the liquid opening is connected to a source line for adding liquid to the intermediate food product, and further comprising a pump means connected to the source line for pumping the liquid to be added at a pressure great enough that added liquid flows through the holes and into the central chamber.

4. The apparatus of claim 1 in which the scraped surface liquid adjustment device further comprises a seal which divides the liquid receiving space into separated upper and lower regions and a liquid opening for each of said regions.

5. The apparatus of claim 4 in which the liquid opening of said lower region is connected to a drain line for draining away excess liquid from the intermediate food product thereby producing a second stage intermediate food product, and the liquid opening of said upper region is connected to a source line for adding liquid to the second stage intermediate food product.

6. The apparatus of claim 4 and comprising means connecting the liquid opening of said lower region to a source line for adding liquid to the intermediate food product thereby to produce a second stage intermediate food product, pump means for pumping the liquid to be added at elevated pressure to the lower region, and means connecting the liquid opening of said upper region to a drain line for draining excess liquid from the second stage intermediate food product.

7. In a closed system for continuous processing of a first intermediate food product containing a substantial liquid content into a final food product of a different character by the addition of a second intermediate food product containing a substantial liquid content, the combination of a first supply means for supplying the first intermediate food product, a scraped surface heat exchanger operable to heat the first intermediate food product to a predetermined threshold temperature, means for conveying first intermediate food product through the scraped surface heat exchanger, and a scraped surface liquid adjustment device connected to said heat exchanger for adjusting the amount of liquid in the food product from the scraped surface heat exchanger, said adjustment device including inner and outer cylinders forming an intervening liquid receiving space, the wall of said inner cylinder forming a central chamber and having holes through which said chamber communicates with said space, said holes being of a size adequate to allow the second intermediate food product to pass through, a liquid inlet for said receiving space, a liquid addition line connected to said liquid inlet for adding the second intermediate food product, pump means for pumping the second intermediate food product through said liquid inlet at a pressure sufficient to force the second intermediate food product through said holes and into the central chamber whereby the first and second intermediate products are mixed in the central chamber.

8. In a closed system for continuous processing of an intermediate food product containing a substantial liquid content into a final food product of a different character by adjusting the amount of liquid in the intermediate food product in a plurality of steps, the combination of a scraped surface heat exchanger operable to heat the first intermediate food product to a predetermined threshold temperature, means for conveying the intermediate food product through the scraped surface heat exchanger, and a scraped surface liquid adjustment device for adjusting the amount of liquid in the food product from the scraped surface heat exchanger, said scraped surface liquid adjustment device being connected to the scraped surface heat exchanger and including inner and outer cylinders forming an intervening liquid receiving space, said liquid receiving space being divided into separate upper and lower portions by a seal, a liquid opening for each of the upper and lower portions, the wall of said inner cylinder forming a central chamber and having holes through which said chamber communicates with said space, said holes being of a size adequate to allow the passage of liquid to and from the central chamber.

9. In a closed system for continuous processing of an intermediate food product containing a substantial liquid content into a final food product of a different character in a plurality of steps, the combination of a scraped surface heat exchanger operable to heat the intermediate food product to a predetermined threshold temperature, means for conveying the intermediate food product through the scraped surface heat exchanger, and a scraped surface liquid adjustment device for adjusting the amount of liquid in the food product from the scraped surface heat exchanger, said scraped surface liquid adjustment device being connected to the scraped surface heat exchanger and including inner and outer cylinders forming an intervening liquid receiving space, said liquid receiving space being divided into separate upper, middle and lower portions by seals, a liquid opening for each of the upper, middle and lower portions, the wall of said inner cylinder forming a central chamber and having holes through which said chamber communicates with said space, said holes being of a size adequate to allow the passage of liquid to and from the central chamber.

10. In a system for aseptic processing of a food product containing particulate matter, the combination of a supply vessel for said product, a scraped surface heat exchanger operable to heat the product to a sterilization temperature, a product supply line extending from said vessel to said heat exchanger and including a first pump, a holding tube connected to said heat exchanger for receiving product therefrom at sterilizing temperature, scraped surface heat exchanger cooling means connected to the holding tube and operable to cool the sterilized product, a cooled product line leading from said cooling means, a product discharge line, a sterilized water tank, a water return line leading to said tank, valve means operable selectively to connect said cooled product line to said product discharge line or to said water return line, a water supply line leading from said tank and including a second pump, additional valve means for connecting said water supply line to said product supply line downstream from said first pump, and a product deliquifying device in said cooled product line, said device including inner and outer cylinders forming an intervening liquid-receiving space having a liquid outlet, the inner cylinder forming a central chamber and having holes through which said chamber communicates with said space, said cooled product line including inlet duct means leading to a product inlet of said chamber and outlet duct means leading from a product outlet of said chamber, a rotor in said chamber having scraper means engageable with the inner surface of the inner cylinder, and means for driving the rotor to cause said scraper means to expel liquid through said holes from a product in said chamber while scraping product from said inner surface, whereby expelled liquid is discharged through said space and liquid outlet, a diversion line for conducting a product from said inlet duct means to said outlet duct means while by-passing the deliquifying device, and third valve means for selectively rendering said diversion line operable and inoperable.

11. The combination of claim 10, in which said driving means are adjustable to vary the rotational speed of the rotor and thereby vary the amount of expelled liquid.

12. The combination of claim 10, comprising also a cooler in said water return line.

13. The combination of claim 10, comprising also a back pressure valve in said water return line.

14. The combination of claim 13, comprising also a cooler located in said water return line upstream from the back pressure valve.

15. The combination of claim 10, in which said third valve means are aseptic valve means, the combination comprising also a first steam supply duct leading into said inlet duct means at a region between the aseptic valve means and said product inlet, a second steam supply duct leading into said outlet duct means at a region between the aseptic valve means and said product outlet, and a third steam supply duct leading into said liquid-receiving space.

16. The combination of claim 15, comprising also a liquid drain line, a steam trap, and valve means for selectively connecting said liquid outlet to said drain line or the steam trap.

17. For use in processing a sterile food product containing particulate matter, a deliquifying device comprising inner and outer cylinders forming an intervening liquid-receiving space having a liquid outlet, the inner cylinder forming a central chamber and having holes through which said chamber communicates with said space, said chamber having a product inlet and a product outlet, inlet duct means leading to said product inlet, outlet duct means leading from said product outlet, a rotor in said chamber having scraper means engageable with the inner surface of the inner cylinder, means for driving the rotor to cause said scraper means to expel liquid through said holes from a product in said chamber while scraping product from said inner surface, whereby expelled liquid is discharged through said space and liquid outlet, a diversion line including aseptic valve means for directing flow from said inlet duct means to said outlet duct means while bypassing said chamber, a first steam supply duct leading to said inlet duct means at a region between the aseptic valve means and said product inlet, a second steam supply duct leading to said outlet duct means at a region between the aseptic valve means and said product outlet, and a third steam supply duct leading into said liquid-receiving space.

18. The device of claim 17, in which said diversion line includes an aseptic 3-way valve in each of said inlet duct means and outlet duct means, each aseptic valve having a side remote from said chamber and having another side adjacent said chamber, and a bypass flow connection between said remote sides of the aseptic valves.

19. The device of claim 17, comprising also a liquid drain line, a steam trap, and valve means for selectively connecting said liquid outlet to said drain line or to said trap.

20. The device of claim 18, comprising also a liquid drain line, a steam trap, and valve means for selectively connecting said liquid outlet to said drain line or to said trap.

21. The device of claim 17, in which said driving means are adjustable to vary the rotational speed of the rotor and thereby vary the amount of expelled liquid.

* * * * *

UNITED STATES PATENT AND TRADEMARK OFFICE
CERTIFICATE OF CORRECTION

PATENT NO. : 4,667,590

DATED : May 26, 1987

INVENTOR(S) : William J. D. Balaam et al.

It is certified that error appears in the above-identified patent and that said Letters Patent is hereby corrected as shown below:

On the title page, Item [73] should read

-- [73]   Assignee: Alfa-Laval, Incorporated, Ft. Lee, N. J. --.

Signed and Sealed this

Twenty-ninth Day of September, 1987

Attest:

DONALD J. QUIGG

Attesting Officer      Commissioner of Patents and Trademarks